Dec. 12, 1961          G. R. MARNER          3,012,728

SATELLITE APPARENT POSITION COMPUTER

Filed July 23, 1958          4 Sheets-Sheet 1

INVENTOR.
GENE R. MARNER
BY
ATTORNEY
AGENT

Dec. 12, 1961 — G. R. MARNER — 3,012,728
SATELLITE APPARENT POSITION COMPUTER
Filed July 23, 1958 — 4 Sheets-Sheet 3

INVENTOR.
GENE R. MARNER
BY
ATTORNEY
AGENT

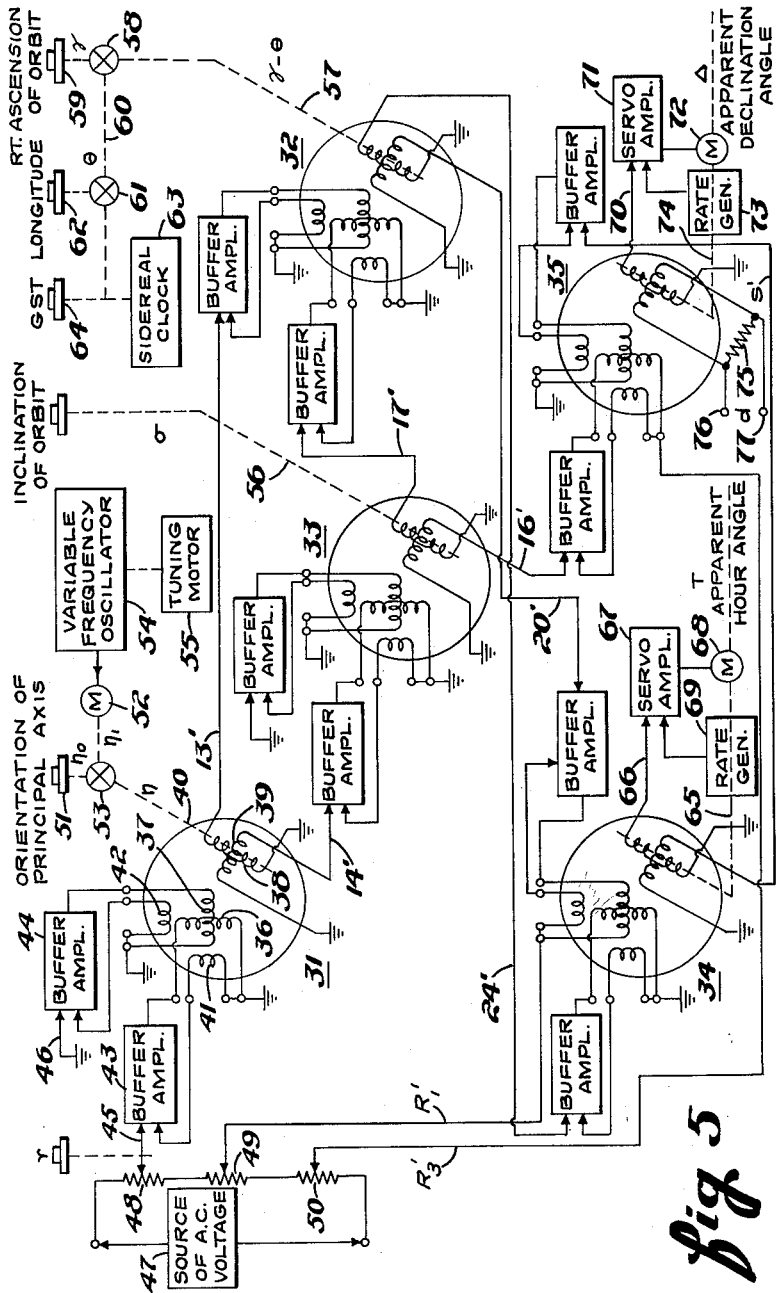

United States Patent Office 3,012,728
Patented Dec. 12, 1961

---

3,012,728
SATELLITE APPARENT POSITION COMPUTER
Gene R. Marner, Marion, Iowa, assignor to Collins Radio Company, Cedar Rapids, Iowa, a corporation of Iowa
Filed July 23, 1958, Ser. No. 750,379
4 Claims. (Cl. 235—188)

This invention relates to computer systems that aid in training navigational or astronomical instruments and particularly pertains to computers that may be utilized for determining the direction of a satellite with respect to a particular observer's location.

A system for computing the direction of a satellite must have inputs for inserting parameters that are derived from the predetermined location of the orbit of the satellite with respect to the center of the earth, parameters that are derived from the rate of rotation of the earth, and parameters that are derived from the usual navigational coordinates that correspond to the location of the observer. In response to the application of these parameters, the system provides the apparent declination angle and the apparent hour angle of the satellite for the particular observer's location. The present invention comprises a plurality of electromechanical resolvers that have input circuits for receiving certain ones of the required parameters in equivalent electrical values and other parameters as input shaft positions, said resolvers being connected to other resolvers that have output shafts, said output shafts being positioned in accordance with input information to indicate apparent hour angle and apparent declination angle of the satellite which is to be observed.

An object of the present invention is to provide a computer that will continuously translate universal parameters for locating a satellite with respect to the center of the earth into parameters for determining the direction of the satellite from a particular observer's location at a particular time.

Features of the invention will become apparent with reference to the following description and the accompanying figures:

FIGURE 5 shows the computer of this invention in schematic and block diagram form.

Figure 1:
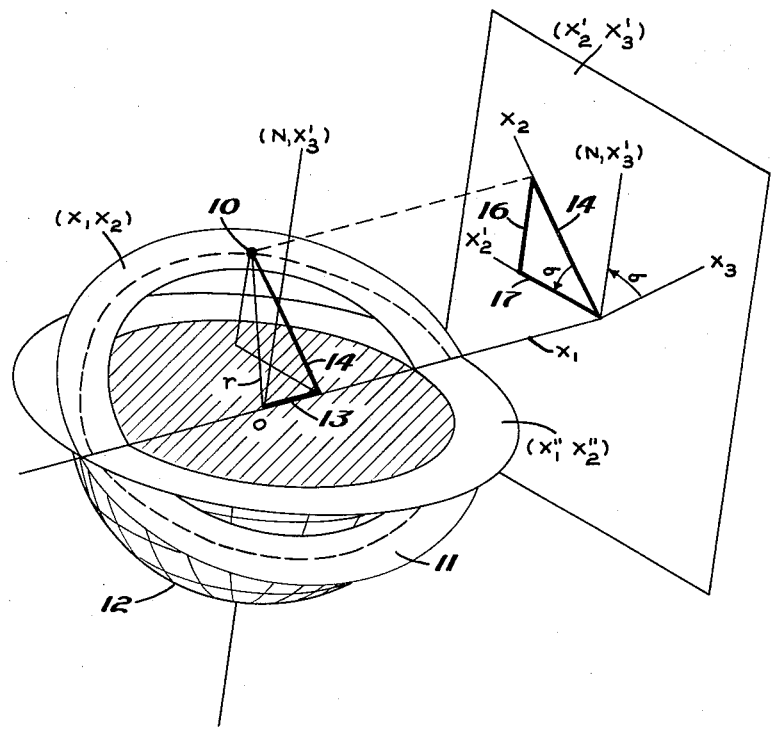
FIGURE 1 is a diagram for showing with reference to the terrestrial sphere differently oriented planes to which cartesian coordinates are to be applied for describing the location of a satellite.

The operation of the computer may be understood more clearly with reference to a mathematical analysis. The radius vector $r$ of FIGURE 1 is defined as that vector which extends from the center O of the earth to the center of a satellite 10. The coordinates of the radius vector as related to its orbital plane are successively rotated to define the radius vector in different coordinates that are related to a terrestrial sphere. Finally a process of subtraction is applied to two out of three components that define the radius vector in coordinates of the terrestrial sphere to obtain final components with coordinates that have their origin at the observer's location. The final components define a new vector which extends from the observer's location to the satellite.

Firstly, the radius vector is defined in coordinates of an $(X_1, X_2)$ plane (FIGURE 1) which contains the orbit 11 of the satellite. These coordinates are directed so that one of them also lies in the equatorial plane ($X_1''$, $X_2''$) and is therefore the line of intersection of these planes. The node or coordinate $X_1$ that is referred to in this description and the appended claims is this line of intersection.

Secondly, with respect to the orbital plane, that component $X_2$ which is perpendicular to the node is resolved into rectangular components having coordinates in a plane that is perpendicular to the node. The coordinates of this plane ($X_2'$, $X_3'$) are rotated through the angle $\sigma$ so that one coordinate $X_3'$ is the axis of the rotation of the earth and the other coordinate $X_2'$ lies in the equatorial plane. The position of the satellite has now been defined as having coordinates intersecting at the center of a terrestrial sphere, one coordinate being the axis of rotation (north or $X_3'$ coordinate), another being the node $X_1$, and finally one coordinate, $X_2'$, being perpendicular to the node in the equatorial plane.

Figure 2:
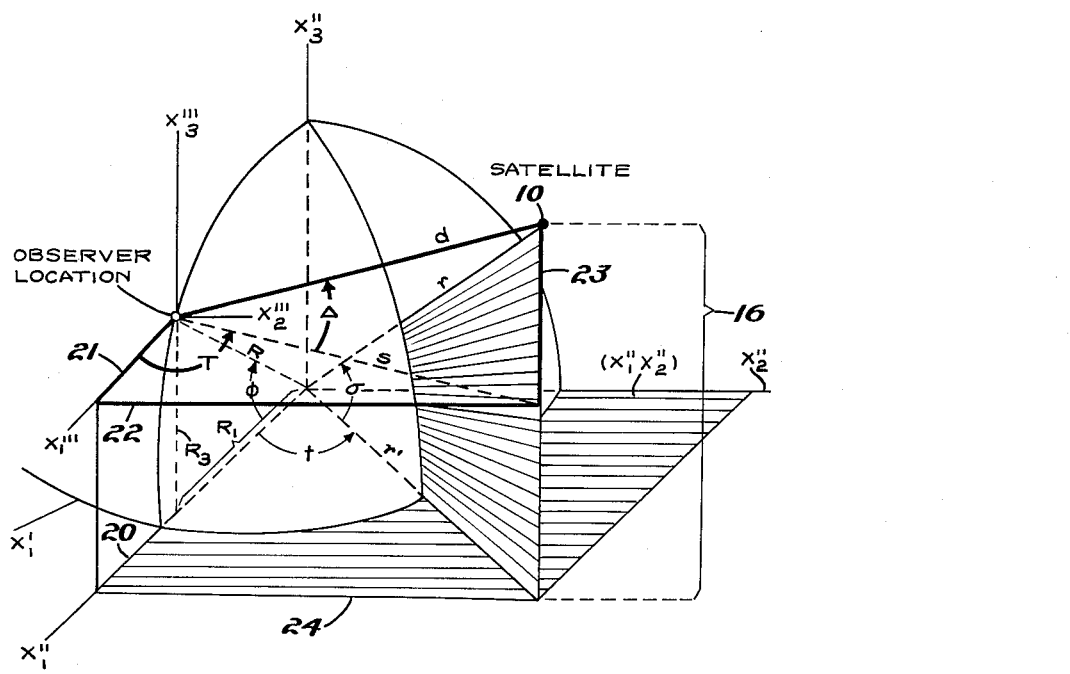
FIGURE 2 is a diagram to show translation of a coordinate system that has its origin at the center of the earth to a system that has its origin at the observer's location.

The final set of rectangular coordinates ($X_1'''$, $X_2'''$, $X_3'''$, FIGURE 2) for defining the direction of the radius vector, intersect at the observer's location and are parallel with the preceding corresponding terrestrial coordinates. In FIGURE 2 the position of the satellite 10 is shown at a distance $r$ from the center of the earth and a distance $d$ from an observer location. The vector $r$ has terrestrial components 20 and 24 which lie in the earth's equatorial plane. Component 20 is in the direction of the observer's meridian, and component 24 is perpendicular to the observer's meridian. Another component 16 is parallel to the axis of rotation of the earth. The vector $d$ has corresponding components 21, 22, and 23 which are parallel to the terrestrial components. The angles T and Δ are provided in the output of the computer. The apparent declination of the satellite 10 with respect to the observer's position is the angle Δ between the vector $s$ that is parallel to the equatorial plane and the vector $d$ which extends between the observer's location and the satellite 10. The angle T is the apparent hour angle of the satellite with respect to the observer's location. The components of the final coordinates are derived from the components of the terrestrial sphere by subtracting individual predetermined lengths from the north $X_3''$ and from the node $X_1'''$ components and by using the identical value for the remaining component. These components are then converted into an apparent hour angle and an apparent declination angle for determining the direction of satellites from the observer's location. An indication of distance $d$ of the satellite from the observer's location may also be obtained from these components.

More particularly, in FIGURE 1, satellite 10 is shown in its orbit 11 about the earth 12. The position of the orbit with respect to the earth has been determined from previous observations. From information that defines the position of the orbit, the computer derives parameters that indicate the direction of the vector $d$, FIGURE 2, that extends from the observer's location to the satellite. If desired, the length of this vector may also be obtained.

Figure 3:
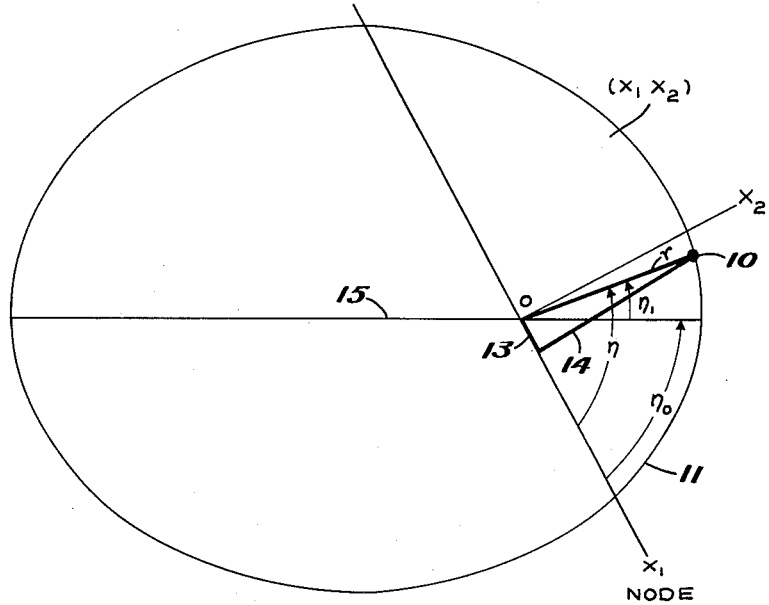
FIGURE 3 is a diagram to show certain rectangular components of the radius vector on a plane peripendicular to the node.

The radius vector $r$ that extends from the center O of the earth may first be considered to be resolved into rectangular components in the ($X_1, X_2$) plane of the orbit 11 as shown in FIGURES 1 and 3. Since each of the accompanying drawings, FIGURES 1–4, is merely for the purpose of showing mathematical relationships, no attempt has been made to retain the size and shape of the orbits in successive figures. Commonly, the orbit 11 of a satellite has a major axis that is noticeably longer than the minor axis as shown in the elliptical orbit of FIGURE 3. As described hereinafter, a voltage having a value that is determined by the length of the radius vector is applied to an input circuit of the computer. This input circuit is connected to a resolver that resolves the radius vector into voltages that have values corresponding to the components shown in FIGURE 3. One coordinate for the components of the radius vector is the node or $X_1$ coordinate and the coordinate for the other component is $X_2$ which is perpendicular to the node and lies in the orbital plane. The direction of the satellite from the center O of the earth is, therefore, the vector sum of the $X_1$ component 13 and the $X_2$ component 14. The length of each component corresponds to the amplitude of a voltage that is derived from a corresponding output of the resolver. The direction of the satellite 10 from the center O of the earth at a particular time is a function of the angle $\eta$ between the node or the $X_1$ coordinate and the radius vector $r$. This angle is a sum of the angle $\eta_0$ between the node and the principal axis 15 of the orbit 11 and angle $\eta_1$ which is a function of the velocity of the satellite.

In the computer, the $X_2$ component as shown in FIGURE 3 is resolved into rectangular components in the $(X_2', X_3')$ plane of FIGURE 1 that is perpendicular to the node or $X_1$ coordinate. This plane onto which the components are to be projected may for convenience be considered to be perpendicular to the node at a point coincident wtih the origin of the $X_2$ coordinate. The $X_2$ component 14 is resolved into rectangular components 16 and 17 in the $X_3'$ and $X_2'$ coordinates respectively. The $X_3'$ or north coordinate is parallel to the axis of rotation of the earth and the $X_2'$ coordinate lies in the equatorial plane. The $X_2$ component 14 and the $X_2'$ component 17 form the angle $\sigma$ which is the angle of inclination of the orbital plane to the equatorial plane. As described subsequently voltages that have values corresponding to these components are developed in the computer. The north component 16 has a value equal to the value of component 14 multiplied by sin $\sigma$ and may be expressed as $X_2 \sin \sigma$ and likewise the equatorial component 17 may be expressed as $X_2 \cos \sigma$.

Figure 4:
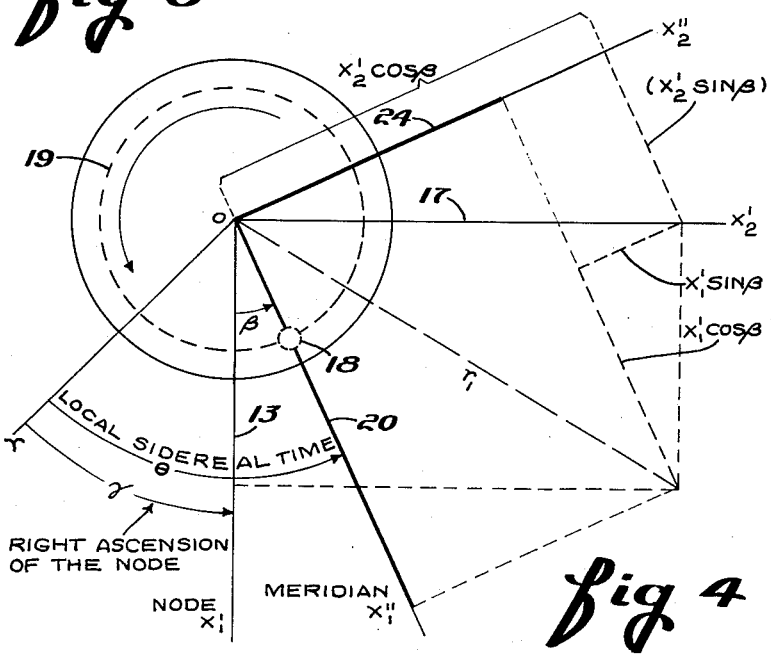
FIGURE 4 is a diagram to show certain rectangular components of the radius vector on the equatorial plane.

Another resolver in the computer receives voltages having values corresponding to the $X_1$ component 13 of FIGURES 1 and 3 and the $X_2'$ component 17 of FIGURE 1 which have been shown to be in the equatorial plane. This resolver resolves the vector sum of these components as shown in FIGURE 4 into a new set of components that are rotated with respect to components 13 and 17 by an angle included between the $X_1$ or node component 13 and the meridian 20 of the observer's location. In FIGURE 4 the following are projected upon the equatorial plane: the observer's location 18, the circle of latitude 19 that passes through the observer's location and also the radius vector $r$ which is shown as vector $r_1$ on the equatorial plane. The angle $\beta$ through which the components are rotated is equal to the difference between the angle $\theta$ and the angle $\gamma$, angle $\theta$ being the angle included within the vernal equinox $\Upsilon$ and the meridian 20 of the observer's location and the angle $\gamma$ being included between the vernal equinox and the node $X_1'$. Since the observer's meridian rotates with the earth, angle $\beta$ increases in a clock-like manner. The value of the derived component 20, that has the direction of the observer's meridian, as related to the previous component having a coordinate $X_1'$ is $$X_1' \cos \beta + X_2' \sin \beta$$

and the value of the derived component 24 that has a coordinate $X_2''$ is $X_2' \cos \beta - X_1' \sin \beta$. These two components in conjunction with the north component 16 shown in FIGURE 1 constitute components having an origin at the center of the earth for determining the position of the radius vector $r$ and, therefore, are defined herein as being components having coordinates in the terrestrial sphere. With reference to FIGURE 2 these components are the $X_1''$ or medium component 20, $X_2''$ component 24, and the $X_3''$ or north component 16.

Finally, the three components of the radius vector are translated into components that have an origin at the observer's location, each of these components being parallel to the respective components of the terrestrial sphere. In order to obtain coordinates for the observer's location, the terrestrial coordinates of FIGURE 2 may be considered to be moved outwardly along the meridian coordinate $X_1''$ and then parallel with the north coordinate $X_3''$ until the origin of the components coincides with the observer's location. The length of the meridian component or of the north component will, therefore, be changed in length by an amount equal to the length of the respective component of a vector R between the center of the earth and the observer's location. In FIGURE 2 the components shown for vector $d$ that extends from the observer's location to the center of the satellite are components 21, 22 and 23 for the $X_1'''$ or node coordinate, the $X_2'''$ coordinate, and the $X_3'''$ or north coordinate respectively. The length of the $X_1'''$ components 21 is equal to the length of the component 20 of the equatorial plane less the length of $R_1$. Vector R extends from the center of the earth to the observer's location and component $R_1$ is the projection of vector $R_1$ on the $X_1''$ coordinate. The length of the $X_2'''$ component is identical to the length of the corresponding component in the equatorial plane. The length of the $X_3'''$ component 23 is the length of the $X_3'''$ component 16 of the equatorial plane less the length $R_3$ which is the projection of vector R on the $X_3'''$ coordinate.

As shown in FIGURE 2 when the angle that is included between the radius vector R and the $X_1''$ coordinate or node is angle $\phi$, then $R_1$ equals $R \cos \phi$ and $R_3$ equals $R \sin \phi$. Voltages that are to be applied to the computer and that are equivalent to $R_1$ and $R_3$ are calculated from these equations. The value substituted for R is a voltage having a value such that the voltages for the radius vector $r$ and for vector R are in proportion to the lengths of the respective vectors. The position of the satellite 10 is shown at a distance $r$ from the center of the earth and a distance $d$ from an observer location. The vector $r$ has terrestrial components 20 and 24 which lie in the earth's equatorial plane. Component 20 is in the direction of the observer's meridian, and component 24 is perpendicular to the observer's meridian. Another component 16 is parallel to the axis of rotation of the earth. The vector $d$ has corresponding components 21, 22, and 23 which are parallel to the terrestrial components.

The five resolvers 31–35 shown in FIGURE 5 have necessary windings for resolving either an input voltage or the vector sum of two input voltages into two output voltages having amplitudes corresponding to the lengths of components of a rectangular coordinate reference system. The coordinate system for the output components may be rotated through any angle with respect to the coordinates of the input vectors by rotating the output windings with respect to the input windings in accordance with well-known principles. For example, resolver 31 has stationary input windings 36 and 37, the electrical axis of each of these windings being disposed at an angle of 90° with respect to the other. The input windings are coupled to a pair of output windings 38 and 39 that are disposed electrically at an angle of 90° to each other on a rotor that is operated by shaft 40. In addition, small compensating windings 41 and 42 are coupled to input windings 36 and 37 respectively. The compensating windings 41 and 42 are connected to feedback input circuits of buffer amplifiers 43 and 44 respectively, and the output of each of the buffer amplifiers 43 or 44 is connected to a respective input winding 36 or 37. A complete circuit including a compensating winding, a buffer amplifier and a respective input winding form a feedback loop which maintains the maximum coupling coefficient between the input and output windings at unity and the phase shift between the input and output at zero over an extremely wide dynamic range of input voltages. Each of the buffer amplifiers may be considered to be part of the resolver and the input of each of the resolvers hereinafter will be considered to be that input of the buffer amplifier that determines the voltage that is applied to a corresponding input winding. For example, the input for winding 36 is the input 45 of buffer amplifier 43 and the input for winding 37 is the input 46 of buffer amplifier 44.

Briefly, resolver 31 of FIGURE 5 resolves the voltage for the radius vector $r$ into two voltages that have amplitudes corresponding to the lengths of rectangular components in the plane of the satellite orbit. The component that is in the plane which is perpendicular to the node but is not in the equatorial plane is applied to resolver 33 and is resolved into equatorial and north components. Resolver 32 rotates these rectangular components that are in the equatorial plane until one component coincides with the meridian of the observer's location. Resolver 34 in conjunction with a controlled source of voltage converts these components of the equatorial plane to a coordinate system that is related to the observer's location and also converts the components to polar form for providing an output reading which is the apparent hour angle of the satellite with respect to the observer's location. Resolver 35 in conjunction with a controlled source of voltage resolves the north $X_3''$ component of the terrestrial sphere and the vector sum of the equatorial components into the apparent angle of declination of the satellite with respect to the observer's location and also provides the voltage that is indicative of the distance between the observer and the satellite.

The input voltages for the computer of FIGURE 5 is supplied by a source of alternating-current voltage 47 that is connected in series with potentiometers 48, 49, and 50. Since the required input voltages are derived from these potentiometers which comprise a voltage divider, the voltages always have the desired proportional relationship regardless of variations in the source of voltage. Alternating-current voltage having an amplitude corresponding to the length of the radius vector $r$ as shown in FIGURE 3 is applied from the arm of potentiometer 48 to input 45 of resolver 31. The other input of the resolver is short circuited through its buffer amplifier to ground so that the voltages induced into the rotor windings of resolver 31 have amplitudes corresponding to rectangular components of the voltage that is applied to input 45. The direction of the coordinate system for the output components is determined by the position of shaft 40 that is connected to the rotor. This shaft is positioned according to angle $\eta$ which is shown in FIGURE 3 between the node $X_1$ and the radius vector $r$. The position of this shaft is determined by control 51 and motor 52 that operate through differential gears 53. Control 51 is a relatively fixed adjustment that is determined by angle $\eta_0$ which is then angle between the slowly changing node and principal axis of the orbit of the satellite. The angle $\eta_1$, which is the angle between the principal axis and the radius vector, varies according to the motion of the satellite and is determined by the variable frequency oscillator 54 that is controlled by tuning motor 55.

The amplitude of the voltage across output winding 38 that is connected to conductor 13' corresponds to the length of the node component 13 of FIGURE 3 and the voltage across output winding 39 that is connected to conductor 14' corresponds to component 14. The voltage for component 14 is applied to an input winding of resolver 33. Since the input is short-circuited to ground, the voltages that are induced into the rotor windings correspond to components of the input voltage applied from conductor 14'. The direction of the input voltage as related to the coordinate system of the output voltages is determined by the position of shaft 56 that is positioned in accordance with angle $\sigma$ which is the inclination of the orbit of the satellite with respect to the equatorial plane. The output voltage that is applied from one output of resolver 33 to conductor 17' has an amplitude corresponding to the length of the equatorial component 17 of FIGURE 1, and the voltage that is applied from the other output winding to conductor 16' has an amplitude corresponding to the north component 16.

The voltage that corresponds to component 13 of FIGURE 3 is applied through conductor 13' to the first input winding of resolver 32 and the voltage that corresponds to the equatorial component 17 of FIGURE 1 is applied through conductor 17' to the second input winding of this resolver. This resolver translates these equatorial components into a second set of rectangular components which have their coordinates rotated with respect to the components that are applied to the input of the resolver by an angle determined by shaft 57. With reference to FIGURE 4 the position of the shaft corresponds to the angle $\beta$ that is included between the node $X_2$ and the vernal equinox $\Upsilon$ and which is equal to angle $\theta$ minus angle $\gamma$. Angle $\theta$ is included between the vernal equinox and the meridian $X_1''$ and is measured by local sidereal time. The angle $\gamma$ is included between the vernal equinox and the node $X_1'$ and corresponds to the right ascension of the node. Shaft 57 is connected through differential 58 to control 59 that is adjusted according to the right ascension of the node and also to shaft 60 that is positioned according to local sidereal time. Shaft 60 is connected through a differential 61 to longitude control 62 and to sidereal clock 63 which is set by control 64 to Greenwich sidereal time.

The output voltage from one winding of resolver 32 corresponds to component 24 and is applied through conductor 24' to an input winding of resolver 34. Voltage applied from the other output winding of resolver 32 has an amplitude corresponding to the length of component 20 and is applied through conductor 20' to one terminal of the other input winding of resolver 34, and a predetermined voltage having a magnitude corresponding to the length of the vector $R_1$ of FIGURE 2 is applied from the arm of potentiometer 49 through conductor $R_1'$ to the other terminal of this input winding. The difference between the voltage that is applied to conductor 20' and the voltage that is applied to conductor $R_1'$ is equal to the meridian component 21 of the observer's location as shown in FIGURE 2. The direction of the magnetic field that is set up within resolver 34 corresponds to the vector sum of the voltages that correspond to the amplitudes of components 22 and 21 and that are applied to the two input windings. The vector sum of these voltages equals the vector $s$ which is shown in FIGURE 2. The vector $s$ is the projection of the vector $d$, which extends between the observer's location and the satellite 10, upon the plane which is defined by the $X_1'''$, $X_2'''$ coordinates. The angle subtended between meridian coordinate $X_2'''$ and the vector $s$ is the hour angle measured between the observer's meridian and the meridian of the satellite 10. The rotor of resolver 34 is positioned by shaft 65 that is operated by a servo control system such that the voltage that is induced into the output winding that is connected to input 66 of servo amplifier 67 is at a null. The servo system includes servo amplifier 67, servo motor 68, and rate generator 69 that are connected to rotor shaft 65. Since the direction of the magnetic field in resolver 34 corresponds to the direction of the radius vector $s$ as shown in FIGURE 2, the position of shaft 65 is a function of the hour angle T and, therefore, the shaft position may be calibrated to indicate the apparent hour angle of the satellite with respect to the observer's location. When the instant computer system is incorporated in an automatic tracking system that positions a reflector, shaft 65 may be connected to a control system for automatically positioning the reflector to the required azimuth for tracking a satellite. Obviously the other output winding of resolver 34 is automatically positioned with respect to 5 magnetic field to provide an output voltage that has an amplitude corresponding to the length of the vector $s$ of FIGURE 2. The output of this winding is connected through conductor $s'$ to an input winding of resolver 35.

The voltage having an amplitude corresponding to the length of vector $s$ of FIGURE 2 is applied to one input winding of resolver 35 and the voltage corresponding to the north component 23 is applied to the other input winding. The voltage corresponding to component 23 is obtained by subtracting the voltage corresponding to component $R_3$ from the voltage having an amplitude corresponding to the north component 16. The voltage corresponding to component 16 is applied from the output winding of resolver 33 through conductor 16' to one terminal of this input winding, and a voltage corresponding to $R_3$ is applied from the arm of potentiometer 50 through conductor $R_3'$ to the other input terminal of the same winding. The direction of the magnetic field of resolver 35 is a function of the angle $\Delta$ which is included between vector $s$ that is parallel to the equatorial plane and the vector $d$ that extends between the observer's location and the satellite. Obviously this angle is the apparent declination angle of the satellite for the observer.

The rotor of resolver 35 is automatically positioned until the voltage across the voltage of one of the output windings is null in the same manner as described for resolver 34. This output winding is connected through conductor 70 to the input of the conventional servo shaft positioning system that comprises servo amplifier 71, servo motor 72 and rate generator 73. The servo motor and the rate generator are connected to rotor shaft 74. Since the rotor of resolver 35 is positioned in accordance with the direction of the magnetic field, the output shaft 74 may be calibrated to show the apparent declination angle of the satellite with respect to the observer. This shaft may also be connected to the control system of an antenna reflector so that it operates in conjunction with positioning information supplied by shaft 65 to direct the reflector to the satellite's position. The other output winding of resolver 35 is connected across termination resistor 75. The output winding in addition to being connected to resistor 75 may be connected to output terminals 76 and 77 for measuring a voltage having an amplitude corresponding to the distance between the observer and the satellite. Obviously that winding which is connected to resistor 75 is always positioned by servo motor 72 so that it is aligned in the magnetic field according to the direction of the vector sum of components $s$ and 23.

The computer of FIGURE 5 may be used at a single location for determining tracking information for many outlying locations. It may also be connected to automatic tracking devices at the individual locations to apply input signals to the tracking device to show approximately the position of the satellite at a particular time with respect to the location. Although the computer for determining the direction of the satellite has been shown in the single embodiment of the accompanying drawings, various changes and modifications that are obvious to those skilled in the art may be included and still be within the spirit and scope of the following claims.

What is claimed is:

1. In a computer system for determining the direction of a satellite from an observer's location, adjustable means connected to a single source of voltage for developing first, second, and third voltages of individual, selected values that maintain proportionate values after their determination, said adjustable means establishing that said first voltage is proportional to the length of a predetermined radius vector extending from the center of the earth to the center of said satellite, means for resolving said first voltage into three voltages having respective coordinates in the terrestrial sphere, one of said coordinates being the axis of rotation of the earth and the others of said coordinates being directed in the equatorial plane, one of said coordinates in the equatorial plane being in the direction of the meridian of said observer's location and the other being in the direction perpendicular to said meridian, first and second resolving means cooperating to translate voltages with cartesian coordinates of one set of reference coordinates to voltages with coordinates of another set of reference coordinates, each of said resolving means having a pair of input circuits, an output circuit, and an output angle indicating means, the voltage developed in each of said output circuits being a vector sum of the voltages that are applied to said respective input circuits, said voltage corresponding to said coordinate in the direction perpendicular to said meridian being applied to one of the input circuits of said first resolving means, said second voltage having a value corresponding to the length of the projection of a second vector on the equatorial plane, said second vector extending from the observer's location to the center of the earth, means for applying the difference of said voltage corresponding to said coordinate in the direction of the meridian of said observer's location and said second voltage to the other input circuit of said first resolving means, the voltage developed in the output circuit of said first resolving means being applied to one of the input circuits of said second resolving means, said third voltage having a value corresponding to the length of the projection of said second vector on said coordinate that is in the direction of the axis of rotation of the earth, means for applying the difference of said voltage corresponding to said coordinate in the direction of the axis of rotation of the earth and said third voltage to the other input of said second resolving means, the angle indicating means of said first resolving means operating in response to the application of voltages to said respective input circuits to indicate the apparent hour angle of said satellite with respect to said observer's location and the angle indicating means of said second resolving means operating in response to the application of voltages to said respective circuits to indicate the apparent declination angle of said satellite with respect to said observer's location.

2. A computer system for determining the apparent hour angle and the apparent declination angle of a satellite with respect to a particular observer's location comprising, first adjustable means for developing a first voltage having a value proportional to the length of the radius vector between the center of the earth and the center of said satellite, means for resolving said first voltage into first and second rectangular components in the orbital plane of said satellite, said first component being in the direction of the node of said satellite and said second component being perpendicular thereto, means for resolving said second component into third and fourth rectangular components that are in a plane perpendicular to said node, the coordinates of said third and fourth components being rotated so that said third component is parallel to the equatorial plane and said fourth component is parallel with the axis of rotation of the earth, means for resolving the vector sum of said first and third components of the equatorial plane into fifth and sixth rectangular components, the coordinate of said fifth component being the meridian of said observer, second adjustable means for establishing a second voltage that has a value corresponding to the length of the projection of a second vector on the equatorial plane, said second vector extending from the observer's location to the center of the earth, a third adjustable means for establishing a third voltage which corresponds to the length of the projection of said second vector on said component that is in the direction of the axis of rotation of the earth, first and second resolvers each being of the type having first and second stationary input windings that are disposed relative to each other at an angle of 90 electrical degrees and a rotor having first and second output windings that are also disposed at an angle of 90 electrical degrees relative to each other, first and second servo means for said first and second resolvers respectively, each of said servo means being connected to one of said output windings of said respective resolver, said servo means operating to rotate said respective rotors for maintaining zero voltage across said respective one output windings, the difference between said fifth component and said second voltage being applied to one input winding of said first resolver, said sixth component being applied to the other winding of said first resolver, the voltage developed across the other output winding of said first resolver being the vector sum of the voltages applied to said respective input windings, and said vector sum voltage being applied to an input winding of said second resolver, the difference between said fourth component and said third voltage being applied to the other input winding of said second resolver, the rotors of said first and second resolvers being operated to positions for indicating respectively the apparent hour angle and the apparent declination angle of said satellite wtih respect to said observer's location.

3. A computer for determining the apparent position of a satellite relative to an observer's location comprising, five resolvers, each of said resolvers having first and second stationary input windings that are disposed relative to each other at an angle of 90 electrical degrees, and a rotor having first and second output windings that are also disposed at an angle of 90 electrical degrees relative to each other, means for applying across an input winding of a first one of said resolvers an alternating-current voltage having a value corresponding to the length of a predetermined radius vector between the center of the earth and a satellite at a particular time, means for rotating the rotor of said first resolver to a position corresponding to the angle between the node of said satellite and said radius vector, a first output winding of said first resolver being connected across an input winding of a second one of said resolvers, a second output winding of said first resolver being connected across a first input winding of a third one of said resolvers, the first output winding of said second resolver being connected to the second input winding of said third resolver, means for rotating the rotor of said second resolver to a position corresponding to the inclination of the orbit of said satellite with respect to the equatorial plane, means for rotating the rotor of said third resolver to a position corresponding to the right ascension of said node, the voltage across the output windings of each of said first and second resolvers being the rectangular components of the voltages that are applied to the respective input windings, the voltages across the output windings of said third resolver being the rectangular components of the vector sum of the voltages applied across its input windings, said components being rotated through an angle corresponding to the position of the respective rotors, a first output winding of said third resolver being connected across a first input winding of the fourth one of said resolvers, means for developing an alternating-current voltage having an amplitude corresponding to the length of the projection of a second vector on the equatorial plane, said second vector extending from the observer's location to the center of the earth, said last means and the second output winding of said third resolver being connected to the second input winding of said fourth resolver for applying thereacross voltage that is equal to the voltage across said last output winding minus the voltage applied by said last means, a first servo system having an output mechanically connected to the rotor of said fourth resolver, the input of said first servo system being connected to the first output winding of said fourth resolver, said first servo system operating in response to the application of voltage from said last winding to its input for positioning said last rotor to obtain a null voltage across said last winding, the second output winding of said fourth resolver being connected across the first input winding of the fifth one of said resolvers, means for developing an alternating-current voltage corresponding to the length of the projection of said second vector on the axis of rotation of the earth, said last means and the second output winding of said second resolver being connected to the second input winding of said fifth resolver for applying thereacross voltage that is equal to the voltage across said last output winding minus the voltage across said last means, a second servo system having an output mechanically connected to the rotor of said fifth resolver and an input connected to the first output winding of said fifth resolver, said second servo system operating in response to application of voltage from said last winding to its input for positioning said last rotor to obtain a null voltage across said last winding, a matching resistor connected across the second output winding of said fifth resolver, and the positions of the rotors of said fourth and fifth resolvers indicating the apparent hour angle and apparent declination angle respectively of said satellite with respect to said observer's location.

4. A computer as claimed in claim 3 having terminals across said matching resistor, the voltage across said terminals having a value corresponding to the distance between said observer's location and said satellite.

References Cited in the file of this patent

UNITED STATES PATENTS

| | | |
|---|---|---|
| 2,408,081 | Lovell et al. | Sept. 24, 1946 |
| 2,723,800 | Marner | Nov. 11, 1955 |

OTHER REFERENCES

Electrical Manufacturing, March 1953, pages 128–133 ("Electrical Resolvers," by Davis).

Johnson ("Analog Computer Techniques"), McGraw-Hill, 1956, New York. Pages 77–81 relied on.